United States Patent [19]

Monajjem

[11] 3,848,369

[45] Nov. 19, 1974

[54] APPARATUS FOR BALANCE CORRECTING PNEUMATIC TIRES USING REFLECTIVE UNBALANCE CONTROL

[75] Inventor: Freydoun Monajjem, Stow, Ohio

[73] Assignee: The General Tire & Rubber Company, Akron, Ohio

[22] Filed: Nov. 13, 1972

[21] Appl. No.: 306,075

[52] U.S. Cl............ 51/165 R, 51/106 R, 51/165.72
[51] Int. Cl............................................. B24b 49/12
[58] Field of Search......... 51/106 R, 165 R, 165.72, 51/139; 53/51

[56] References Cited
UNITED STATES PATENTS

| | | | |
|---|---|---|---|
| 2,678,678 | 5/1954 | Kuechenmeister | 51/165.72 X |
| 2,950,588 | 8/1960 | Gausman | 53/51 |
| 3,120,088 | 2/1964 | Shumaker | 51/139 X |
| 3,553,903 | 1/1971 | Christie | 51/165 R |
| 3,574,973 | 4/1971 | Radal | 51/165 R |
| 3,681,877 | 8/1972 | Shively | 51/106 R |

Primary Examiner—Harold D. Whitehead
Attorney, Agent, or Firm—Harry F. Pepper, Jr.

[57] ABSTRACT

Apparatus and method for balance correcting pneumatic tires are provided by automatically grinding away selected portions of the tread rubber, preferably at center portions of the tread. The pneumatic tire is concentrically rotated in an inflated condition preferably at about 60 rpm. A reflective means is positioned on the tire in reference to a portion to be ground and a light source and light sensing means are positioned to reflect light from the reflective means and output an electric signal responsive to the reflected light sensed. An actuating means is responsive to the electric signal from the light sensing means to actuate a grinding means which removes selected portions of the tire tread. The selective grinding of the tire is precision controlled by (i) the sizing of the reflective means, or (ii) by controlling and/or electronic processing of the electrical signal from the light sensing means.

6 Claims, 3 Drawing Figures

APPARATUS FOR BALANCE CORRECTING PNEUMATIC TIRES USING REFLECTIVE UNBALANCE CONTROL

FIELD OF THE INVENTION

This invention relates to the manufacture of pneumatic tires and particularly automatic precision balancing of weight eccentricities in the tire to improve wear and ride characteristics of the tire.

BACKGROUND OF THE INVENTION

In commercial production it is impossible to build perfectly uniform pneumatic tires because of the many variables and non-constant factors which are encountered in their manufacture. These variables include (i) non-uniformities in the cord fabric such as physical variations in the diameter and length of cords, and bunching or spacing variations in the fabric weave, (ii) non-uniformities in the rubber composition such as unequal dispersion of filler and curing agent, (iii) changes in thickness, location, adhesion and overlap of the various splices or layers in the tire carcass and tire tread, (iv) dimensional and pressure irregularities in the tire building machine and tire curing molds and (v) differences in molding procedures such as temperature changes.

Tire uniformity or irregularity is measured by the degree of perfection of the finished tire with respect to (i) physical dimensions, (ii) weight balance and (iii) dynamic force variations. Separate methods have been devised to correct or compensate for each of these irregularities. For example, it has been described in United States application Ser. No. 613,252, filed Feb. 1, 1967, assigned to the same assignee as the present application, to selectively grind portions of the shoulders of the tire tread in response to force variations realized by rotation of the tire under load. This technique compensates for dynamic force variations exerted by the tire which cause thump, vibration and rough riding characteristics, particularly during high speed travel. See also U.S. Pat. Nos. 3,491,493, 3,500,681, 3,553,903 and 3,574,973 and British Pat. No. 1,177,328. Also it has been known to "true" the dimensions of a tire by placing the tire in a chuck and cutting and grinding the tire tread to remove large amounts of rubber and make the tire perfectly round and concentric relative to the rotational axis of the tire. See U.S. Pat. Nos. 2,765,845, 2,766,563, 2,918,116 and 2,966,011.

Weight balance correcting of pneumatic tires has traditionally been performed by mounting small weights on the rim of the wheel at critical points to compensate for eccentricities in weight. More recently, weight balancing has been performed by adding an adhesive doe or weight pad to the inside wall of the tire at critical places to compensate for weight differences. However, both of these methods are time-consuming and imprecise. Although some selective grinding has been done to weight balance pneumatic tires, it has not been a practice of wide spread use because of its expense and difficulties. It involves either hand buffing of selected portions of the tire after testing for balance, or mounting the tire in an eccentric chuck after testing and then moving the tire into contact with a grinding wheel to selectively remove portions of tire tread. In the latter, time is required to position the tire in the chuck and, moreover, extreme difficulty is encountered in controlling the amount of rubber removed from the tire. Both of these alternatives are also time-consuming and imprecise, as well as expensive.

The present invention overcomes these difficulties and disadvantages and provides relatively inexpensive and simple means for precision weight balance correcting pneumatic tires by selective grinding.

SUMMARY OF THE INVENTION

Apparatus and method are provided to selectively grind a tire tread at the heavy section to reduce with precision the imbalance of a pneumatic tire. The grinding is automatically controlled to selectively grind the tire tread precisely at the heavy spot or a larger section of the tread on a predetermined and variable arc with the heavy spot at the middle of the arc.

After dynamic balance testing by standard apparatus, which automatically marks the light spot on the tire, the pneumatic tire is mounted on a chuck or other rotation means for preferably free rotation in an inflated condition. A grinding means is positioned adjacent the mounted tire and is adapted to selectively grind sections of the tire tread on actuation as hereinafter described.

A reflective means is positioned on the pneumatic tire in reference to the section of the tire tread to be ground. This means may be a reflective mark automatically painted or otherwise applied to the sidewall of the tire by the balance testing apparatus. Preferably, however, it is a reflective tape or the like applied to the sidewall of the tire astride the mark which was applied at the light point of the tire by the balance tester.

A light source is positioned to reflect light from the reflective means on each revolution of the tire. And a light sensing means is positioned to sense the light from the light source reflected from the reflective means and to output an electrical signal responsive to the reflected light. Preferably the light source and light sensing means are positioned about the tire 180° from the grinding means so that the grinding means is in-phase to grind the tire tread at the heavy spot when actuated by the reflective means positioned at the light spot of the tire as above described.

An actuating means is provided to actuate the grinding means to selectively grind the tire. The activating means is responsive to the electrical output from the light sensing means. The embodiment of the actuating means is dependent on the embodiment of the selective grinding means. For example, where either the rotation means or the grinding means are movable to bring the grinding means into contact with the tire tread, the actuating means may comprise a servomechanism starting and stopping said relative motion. On the other hand, if the grinding means is in continuous contact with the tire tread, the actuating means may be simply an electrical switching circuit energizing the power source of the grinding means.

The amount of grinding is very simply controlled with precision. The reflective means is sized to reflect larger or smaller amounts of light for longer or shorter durations of time. The intensity and duration of the light reflection controls the amplitude and timing of the output signal to the actuating means and in turn the heavyness of tread removal and the length of the arc section through which tread is removed from the tire by the grinding means. Alternatively, instead of sizing the reflective means, the same control can be exercised over the grinding means by electrically processing the output from the light sensing means. Specifically, the amplitude and length of the electrical signal is changed by amplifying and pulse stretching means to control the extent of grinding of the tire.

In one preferred embodiment of the invention, the balance testing apparatus automatically places reflective marks on the sidewall of the tread of the tire at the light spot corresponding in number to the amount of rubber to be removed to bring the tire into balance. The light sensing means thus outputs a number of electrical pulses responsive to the number of marks on the tire which are processed by electrical means to preset the count for termination of the grinding sequence. A counting means counts the number of actuations of the grinding means and outputs a signal proportional to the number of counts. When the output matches in intensity the output of the pre-set counter, a switching circuit is actuated to terminate the grinding sequence.

Other details, objects and advantages of the invention will become apparent as the following description of the present preferred embodiments of the invention and the present preferred methods of practicing the same proceeds.

BRIEF DESCRIPTION OF THE DRAWINGS

In the accompanying drawings, the present preferred embodiments of the invention and present preferred methods of practicing the invention are illustrated in which.

DESCRIPTION OF THE PREFERRED EMBODIMENTS

Figure 1:
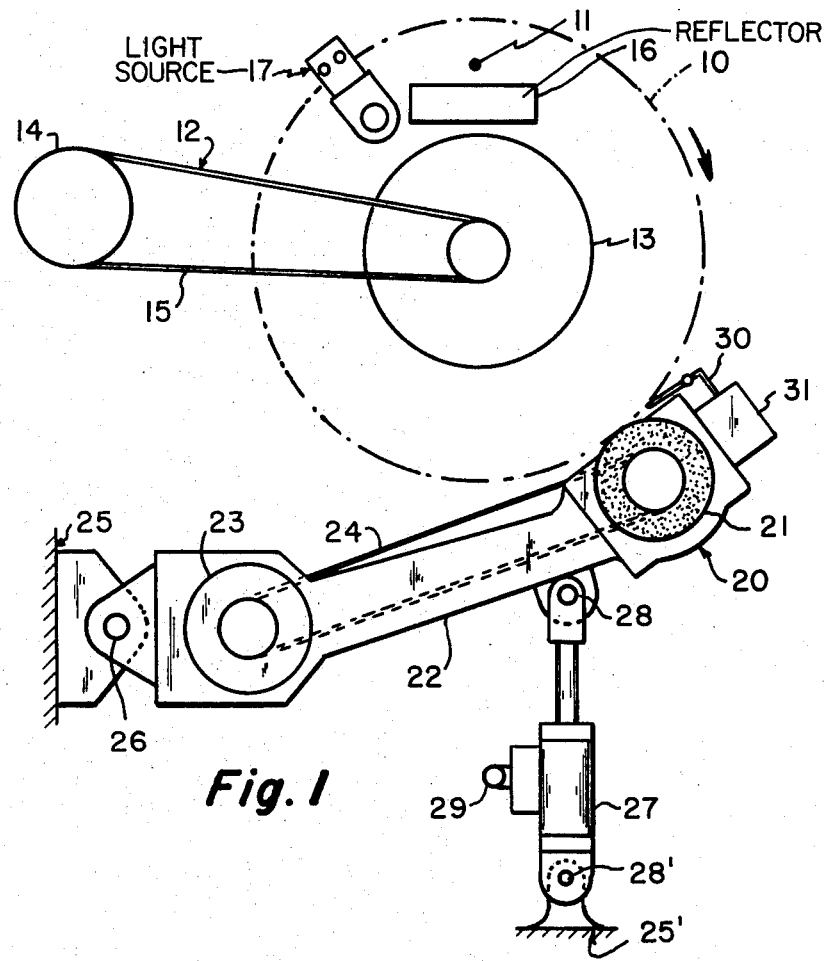
FIG. 1 is an elevation view of an automatic pneumatic tire balancing apparatus in accord with the present invention.

Referring to FIG. 1, apparatus is shown for automatically balance correcting a pneumatic tire with precision. A pneumatic tire 10 is provided which has been previously tested for balance, and mark 11 applied to the sidewall of tire 10 at the light spot.

Rotation means 12 is provided which is comprised of chuck 13, electric motor 14 and pulley assembly 15. Tire 10 is automatically mounted on chuck 13 and automatically rotated and inflated to the standard inflation pressure, as is done in above referred force variation correcting apparatus. Reflective means 16, such as reflective tape, has previously been applied to the sidewall of tire 10 astride the mark 11. Reflective means 16 is sized to correspond to the amount of rubber to be removed from the tread of tire 10 as more fully described below.

The amount of rubber to be removed is typically determined by previous balance testing and stated on the tire by colored marks on the tire removed from the light spot. Typically, the colored mark is white, if the spot is light between 0 and 18 inch-ounces, blue, if the spot is light between 18 and 24 inch-ounces, yellow, if the spot is light between 24 and 30 inch-ounces, red, if the spot is light between 30 and 36 inch-ounces, and all four colors if it is light over 36 inch-ounces. Thus, the sizing of reflective means 16 is categorized to correspond to the color of mark 11 and make the grinding sequence responsive to the balance testing.

The speed of rotation of tire 10 must be precise to provide the timing for the grinding sequence. Typically, motor 14 rotates the tire at 60 rpm, ± 0.3 rpms, with negligible variations therefrom.

As the tire rotates, the reflective means 16 passes under retro-reflective pick-up assembly 17 on each revolution. Pick-up assembly 17 includes a light source 18 and light sensor 19 (see FIG. 2). In operation, light from source 18 is reflected by reflective means 16 as means 16 passes under pick-up assembly 17 and is received by sensor 19. Sensor 19, in turn, outputs an electrical signal responsive to the reflected light received.

Selective grinding means 20 includes grinding wheel 21 mounted on frame 22 which is driven by electric motor 23 through pulley assembly 24 also mounted on frame 22. Frame 22 is pivotally mounted to base 25 at pivot assembly 26 and is pivotally mounted to hydraulic cylinder assembly 27 at pivot assembly 28. Hydraulic cylinder assembly 27 is in turn pivotally mounted to base 25' by pivot assembly 28'. Hydraulic cylinder assembly 27 is part of the grinding means 20 and provides for the selectivity of the grinding by moving frame 22 into and out of contact with the center portions of the tread of tire 10 by control of the hydraulic fluid supplied to the hydraulic cylinder through activating means such as servomechanism 29.

Selective grinding means 20 also includes sensor arm 30 and transducer 31 mounted on frame 22. This provides for positioning of the grinding wheel 21 for commencement of the grinding sequence. As soon as tire 10 is inflated and rotated, servo-mechanism 29 is also actuated to move the frame 22, with grinding wheel 21 mounted thereon, toward the tire. Electric motor 23 is also actuated to maintain rotating the grinding wheel 21. As the grinding wheel 21 approaches tire 10, sensor arm 30 comes into contact with tire 10 and thereupon actuates transducer 31 which in turn actuates servomechanism 29 to stop the movement of grinding wheel 21 toward tire 10. The grinding wheel 21 is thus stabilized in a "retracted" position at a distance of a few thousandths of an inch from the tread surface of tire 10.

Servo-mechanism 29 is also electrically connected to light sensor 19 as hereinafter more fully described with reference to FIG. 2. Thus, when an electrical output is provided by light sensor 19 responsive to light reflected from reflective means 16, the servo-mechanism 29 is actuated to move the rotating grinding wheel 21 into contact with the tread of tire 10 and thereby remove rubber from the tread of tire 10. When the electrical signal is no longer received from light sensor 19, grinding wheel 21 returns and is stabilized in its retracted position by electrical signals from transducer 31 to servomechanism 29. The selective grinding is, thus, a function of the amplitude and duration of the electrical input from the light sensor 19.

Figure 2:
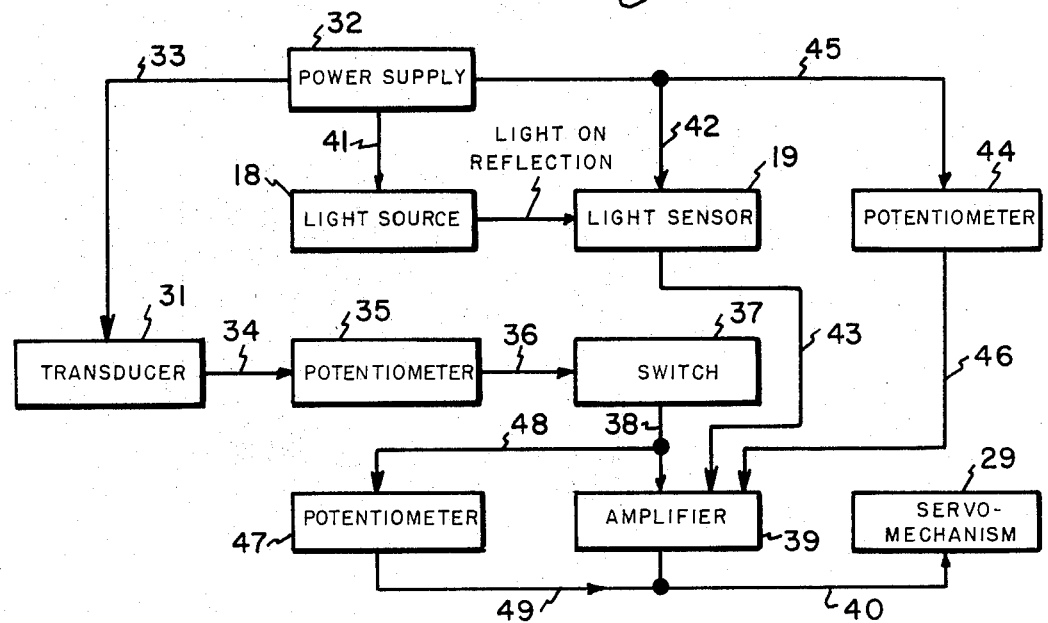
FIG. 2 is a schematic of an electrical circuit in one embodiment of the present invention.

Referring to FIG. 2, the electric circuit for controlling the grinding by the balance correction apparatus is schematically shown.

Power supply 32 provides power to transducer 31 through lead 33. Transducer 31 in turn inputs power to servomechanism 29 through lead 34, potentiometer 35, lead 36, switch 37, lead 38, amplifier 39 and lead 40. Thus, when switch 37 is turned "on" automatically at completion of inflation of tire 10, the circuit is closed, and servo-mechanism 29 is actuated to move grinding means 20 toward the rotating tire 10 on rotation means 12. As the grinding means 20 nears the tire, transducer 31 is actuated by sensor arm 30 to stabilize servo-mechanism 29 so that the grinding means 20 is positioned a few thousandths of an inch from the tread surface of tire 10 as before described. Thus positioned, sensor arm 30 is maintained in contact with the rotating tire 10. Potentiometer 35 can be adjusted to vary the sensitivity of the transducer 31 by controlling the power input to the servo-mechanism 29 through the transducer circuit.

Power supply 32 also provides power to light source 18 via lead 41 and to light sensor 19 via lead 42. Light source 18 is a suitable lamp assembly, optionally with a reflector or other light focusing system, to direct the light onto the tire 10 under pick-up assembly 17. Light sensor 19 is any suitable light activated device such as a photodiode or phototransistor; preferably, however, a phototransistor is used to provide internal gain of the light generated electrical signal.

Upon passage of reflective means 16 under pick-up assembly 17 as described above, light from light source 18 is reflected to light sensor 19. Sensor 19 is thus gated and an electrical output is conducted through lead 43 to amplifier 39. The state of equilibrium of amplifier 39 is thereby upset and an amplified signal is outputted through lead 40 to servo-mechanism 29. The servo-mechanism 29 in turn actuates the hydraulic cylinder assembly 27 and causes the grinding wheel 21 to be rapidly driven toward the tire tread, grinding a predetermined amount of rubber from the tread. As reflective means 16 clears pick-up assembly 17, grinding wheel 21 immediately returns to its retraction position as servo-mechanism 29 again comes under the control of transducer 31.

The amount of rubber ground from the tread on a given actuation is controlled by potentiometer 44 connected to amplifier 39 and power supply 32 through leads 45 and 46 and potentiometer 47 connected in parallel with amplifier 39 through leads 48 and 49. Potentiometer 44 thus controls the position of the grinding wheel 21 with respect to tire 10, and potentiometer 47 controls the gain of amplifier 39 and in turn the amplitude of the electrical signal input to servo-mechanism 29. The amount of rubber ground from the tread can be also controlled by adjusting the width of reflective means 16 which in turn adjusts the intensity of reflected light inputted to the light sensor 19. Typically, the reflective means and the circuit are adjusted so that about one (1) inch-ounce is removed from the tread on a single actuation of the servo-mechanism 29.

The length of the arc section through which the tire is ground for balance is determined by the length of the reflective means 16. Typically, the reflective means is long enough to grind the tire tread along an arc 8 to 10 inches in length.

The placing of reflective means 16 with reference to the heavy spot to be ground is determined by the positioning of pick-up assembly 17 in relation to the grinding means 20. As shown in FIG. 1, the pick-up assembly is positioned 180° from the grinding means 20. Thus, reflective means 16 can, as above described, be positioned astride the mark 11 at the light spot so that the actuation of grinding means 20 is inphase with the rotation of the tire 10.

The number of sequential actuations of grinding means 20 is automatically controlled. A timer (which is part of switch 37) is actuated at the beginning of the cycle when tire inflation is complete, and holds switch 37 on during a preselected time at the end of which it turns switch 37 off, thus terminating the grinding sequence. The opening of the circuit stops the electric power through transducer 31 from being inputted to amplifier 39. Servo-mechanism 29 is thus free of the described circuit and will automatically drain the hydraulic cylinder assembly 27. Grinding means 20 is thereby returned to its repose position where the tire 10 can be deflated and removed from the rotation means 12 and another tire mounted for balance correction.

Figure 3:
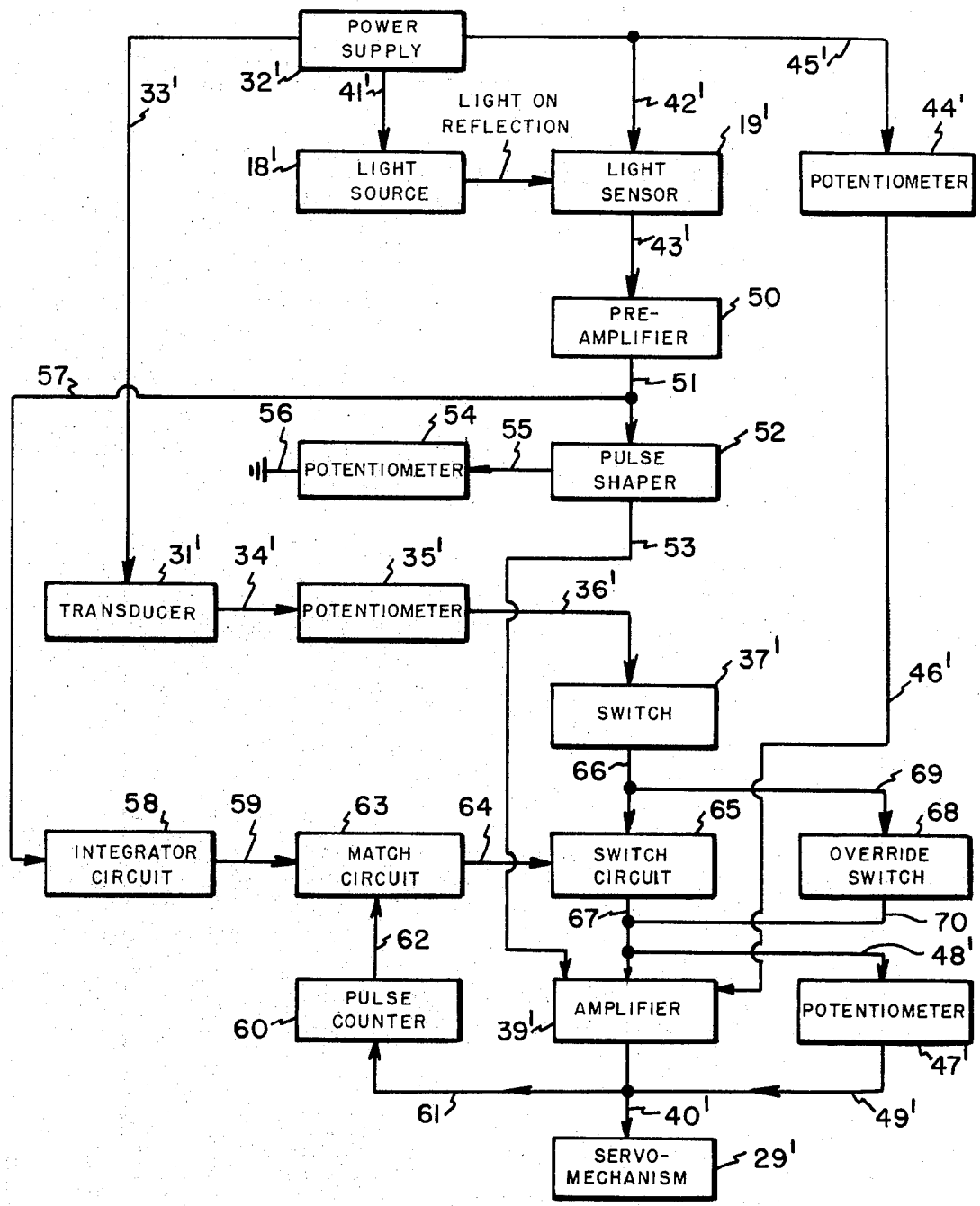
FIG. 3 is a schematic of an alternative electrical circuit in another embodiment of the present invention.

Referring to FIG. 3, an alternative circuit schematic is shown for an alternative embodiment of the invention wherein the length of the arc section through which the tread is ground is controlled by electrically processing the output signal from the light sensor, instead of sizing the reflective means. FIG. 3 also shows other aspects of the invention whereby (i) the amount of total rubber removed from the heavy spot of the tire is automatically programmed by the number of marks placed on the sidewall of the tire, and (ii) the grinding sequence is automatically terminated when the programmed amount of rubber is removed from the tire.

The circuit shown in FIG. 3 has all of the features and operations of the circuit shown and described with respect to FIG. 2. These elements are shown in FIG. 3 and given prime numbers so that their correspondence to FIG. 2 is illustrated by reference.

The length of the grinding arc is controlled by inputting the signal from the light sensor 19' through lead 43' to a pre-amplifier 50. Pre-amplifier 50 amplifies the signal and outputs the signal through a lead 51 to pulse shaper 52. Pulse shapers are available commercially such as DATASCAN Module 427. Pulse shaper 52 stretches the narrow, amplified input signal to a wide signal corresponding to the desired length for the grinding arc and thereafter outputs the signal through lead 53 and amplifier 39' to servo-mechanism 29' for actuation of the grinding means as described with reference to FIG. 2. Potentiometer 54 is branched from pulse shaper 52 through leads 55 and 56 to ground. The length of the arc through which the tire is ground for balance correction is thereby controlled by adjusting potentiometer 54. The control of the grinding arc can thus be independent of the length of the reflective means. The reflective means is only required to be large enough (e.g., ¼ inch × 1 inch) to generate a discernible output from the light sensor 19' and may even be the mark applied at the light spot by the balance testing apparatus.

If desired, the circuitry to control the grinding arc as just described can be inserted into the circuit shown in FIG. 2 and used in connection therewith as above described. However, the grinding sequence is preferably totally automated by automatically programming the amount of rubber to be removed and automatically terminating the sequence upon removal of that amount of rubber.

Referring to FIG. 3, the grinding sequence is automated by placing a series of spaced apart marks on the tire sidewall at the light spot corresponding to the amount of rubber to be removed. For example, in accord with the categorization above described, one mark may be made where the spot is 0 to 18 inch-ounces light, two marks where the spot is 18 to 24 inch-ounces light, three marks where the spot is 24 to 30 inch-ounces light, and four marks where the spot is more than 36 inch-ounces light. The electrical signal generated by the light sensor is thus a series of pulses (e.g., 1 to 4) instead of a single pulse. In this instance, a discriminating circuit is provided as part of the pulse shaper 52 so that only the first pulse is processed through the shaper for use in actuating the servo-mechanism 29'.

A branch lead 57, however, inputs the series of pulses to integrator circuit 58. Circuit 58 integrates the input pulses so that the output through lead 59 from circuit 58 is proportional to the desired number of times grinding means 20 is to grind the heavy spot. The number of pulses supplied to servo-mechanism 29' by amplifier 39' are also supplied through lead 61 to pulse counter 60 where the pulses are counted and integrated. The pulse counter integrates the input signal so that the output therefrom through lead 62 is proportional to the number of pulses supplied to the servo-mechanism and in turn the number of times the grinding means 20 has "hit" the tire.

Both the output from integrator circuit 58 and the output from pulse counter 60 are inputted to a matching circuit 63. The matching circuit 63 compares the inputs, and outputs only when the input from the counter 60 is equal to or is in a selected ratio to the input from the integrator circuit 58. An output from matching circuit 63 to switching circuit 65 via lead 64 is provided only when it is desired, in accordance with the programmed data, to terminate the grinding sequence. Switching circuit 65 is a suitable gating device such as a Field Effect Transistor (FET) positioned between switch 37' and amplifier 39' via leads 66 and 67. The circuit 65 is arranged so that when gated by the matching circuit 63 it will assume a blocking mode and switch off the circuit. The circuit can still be either manually or by means of a timer switched off as desired by the operator by actuation of switch 37', which in this circuit arrangement normally remains in the on state. Also, an override switch 68 is provided via leads 69 and 70 which when switched on, can override the automated system and permit the correcting apparatus to be used in a manual mode as desired.

While the presently preferred embodiments of the invention and methods for using them have been specifically described, it is distinctly understood that the invention may be otherwise variously embodied and used within the scope of the following claims.

What is claimed is:

1. Apparatus for balance correcting pneumatic tires comprising:
   A. a rotation means for rotating an inflated pneumatic tire;
   B. grinding means disposed adjacent said rotation means for removing selected amounts of rubber from selected portions of the tire at a predetermined rate;
   C. a light source disposed adjacent said rotation means and adapted to illuminate reflective, imbalance indicating means on said tire during rotation thereof;
   D. a light sensing means disposed adjacent said rotation means and adapted to sense light from the light source reflected by the reflective means on said tire and output an electrical signal in response to reflected light sensed; and
   E. an actuating means for actuating the grinding means in response to the electrical output from the light sensing means.

2. Apparatus for balance correcting pneumatic tires as set forth in claim 1 wherein:
   the grinding means includes a rotatable grinding wheel and a positioning means for moving said rotatable grinding wheel relative to the tire in response to an electrical signal.

3. Apparatus for balance correcting pneumatic tires as set forth in claim 2 wherein:
   the actuating means controls the electrical input to the positioning means to cause the positioning means to move the grinding wheel in contact with the portion of the tire to be ground when an electrical signal is received from the light sensing means and move the grinding wheel away from the tire when the electrical signal is no longer received from the light sensing means.

4. Apparatus for balance correcting pneumatic tires as set forth in claim 1 comprising in addition:
   electrical means for processing the electrical signal from the light sensing means before input thereof to the actuating means to control the selectivity of grinding by the grinding means.

5. Apparatus for balance correcting pneumatic tires as set forth in claim 1 comprising in addition:
   counter means for presetting and counting the number of times the grinding means are actuated and automatically stopping the actuating means when a preset count is reached.

6. Apparatus for balance correcting pneumatic tires as set forth in claim 5 comprising in addition:
   counter setting means for automatically presetting the counter means based on the electrical signal outputted from the light sensing means by reason of the reflective means on the tire.

* * * * *